United States Patent
Welk et al.

(10) Patent No.: US 6,965,385 B2
(45) Date of Patent: Nov. 15, 2005

(54) METHOD FOR SIMULATING AND DEMONSTRATING THE OPTICAL EFFECTS OF GLASSES ON THE HUMAN FACE

(75) Inventors: Andrea Welk, Munich (DE); Helmut Altheimer, Lauchdorf (DE); Peter Baumbach, Munich (DE); Gregor Esser, Haar (DE); Walter Haimerl, Munich (DE)

(73) Assignee: Rodenstock GmbH, Munich (DE)

( * ) Notice: Subject to any disclaimer, the term of this patent is extended or adjusted under 35 U.S.C. 154(b) by 58 days.

(21) Appl. No.: 10/257,448

(22) PCT Filed: Feb. 13, 2002

(86) PCT No.: PCT/DE02/00511

§ 371 (c)(1),
(2), (4) Date: Mar. 24, 2003

(87) PCT Pub. No.: WO02/065199

PCT Pub. Date: Aug. 22, 2002

(65) Prior Publication Data

US 2003/0156125 A1 Aug. 21, 2003

(30) Foreign Application Priority Data

Feb. 13, 2001 (DE) ................................ 101 06 562

(51) Int. Cl.[7] .............................................. G09G 5/00
(52) U.S. Cl. ..................................................... 345/629
(58) Field of Search ....................... 345/629; 351/207, 351/227

(56) References Cited

U.S. PATENT DOCUMENTS

| | | | |
|---|---|---|---|
| 5,280,570 A | 1/1994 | Jordan | 345/632 |
| 5,926,247 A * | 7/1999 | Kimura | 351/41 |
| 6,095,650 A * | 8/2000 | Gao et al. | 351/227 |
| 6,142,628 A | 11/2000 | Saigo | 351/204 |
| 6,222,621 B1 * | 4/2001 | Taguchi | 356/124 |
| 6,692,127 B2 * | 2/2004 | Abitbol et al. | 351/227 |

FOREIGN PATENT DOCUMENTS

EP 0 299 769 1/1989

(Continued)

*Primary Examiner*—Sumati Lefkowitz
*Assistant Examiner*—Motilewa Good-Johnson
(74) *Attorney, Agent, or Firm*—Crowell & Moring LLP

(57) ABSTRACT

A method is provided for demonstrating an effect of a particular spectacle frame and of optical lenses fitted into this spectacle frame on the appearance of a spectacles wearer as it would be perceived by another person (virtual observer). An image of a face of the spectacles wearer is prepared in such manner that the image can be processes in a computer. An arrangement of the respective spectacle frame in front of the eyes is determined. The image of the face is projected onto a plane by a computation (ray-tracing) of principal rays passing through a center of rotation of an eye of the (virtual) observer to produce a planar image of the face in this plane. Taking into account an optical power of a region, through which a principal ray passes, of each spectacle lens (virtually) fitted in the respective lens rim, and it arrangement in front of the eye, the paths of prinipcal rays which lie within lens rims of the spectacle frame or edges of the spectacle lenses are computed so that an observer of the thus-produced planar image of the face with "worn" spectacles can assess a distortion of the eyes portion of the face by the spectacle lenses and therewith a quality of the spectacle lenses.

25 Claims, 2 Drawing Sheets

FOREIGN PATENT DOCUMENTS

| | | |
|---|---|---|
| EP | 0 362 123 | 4/1990 |
| EP | 0 472 291 | 2/1992 |
| EP | 1011006 | 6/2000 |
| EP | 1018691 | 7/2000 |
| JP | 6-139318 | 5/1994 |
| WO | WO 01/32074 | 5/2001 |

* cited by examiner

METHOD FOR SIMULATING AND DEMONSTRATING THE OPTICAL EFFECTS OF GLASSES ON THE HUMAN FACE

TECHNICAL FIELD

The invention relates to a method for demonstrating the effect of a particular spectacle frame and the optical lenses fitted into this spectacle frame on the appearance of a spectacles wearer as it would be perceived by another person (virtual observer).

BACKGROUND ART

Several methods are known for demonstrating spectacle lenses or for assessing the properties of spectacle lenses. For demonstrating the optical properties of spectacle lenses, representations of isometric lines or pseudo-3D representations of various optical properties of spectacle lenses are frequently used, for example the surface astigmatism or total astigmatism, the surface power or power, and also the appearance. These representations are of a technical nature and can be interpreted only by a person skilled in the art such as, for example, an ophthalmologist.

EP 1 018 691 A1 describes a method and an apparatus for simulating a visual impression. The method described in this publication permits a potential purchaser of spectacle lenses to judge how he will be able to see with the prospective spectacle lenses. An assessment of his own appearance when using these spectacle lenses is not possible with these known methods.

As a rule, the enormous technical complexity of the product "spectacles", i.e. of a certain spectacle frame selected by the future user, and the spectacle lenses selected by the user or recommended to him, can be understood only to a limited extent by a spectacles wearer.

The choosing of the spectacle frame normally presents no great problems to the spectacles wearer, because the spectacles wearer is able to see immediately whether a frame suits him or not. Moreover, various aids are available for choosing a frame. Thus it is known, for example, to take a picture of the customer wearing various spectacle frames, so that the customer can choose the spectacle frame most suitable for him by comparing the photographs or video recordings. This manner of proceeding is particularly preferred by strongly ametropic customers, because they are unable to see themselves with the new frame clearly in a mirror.

The disadvantage of all demonstration means that have hitherto been on the market is that only various spectacle frames can be assessed, but not the effect which the spectacle lenses fitted into the spectacle frames have on the appearance of the face of the customer. Stated precisely, the known demonstration means permit only an assessment of optical properties, for example the refractive error or astigmatism of the spectacle lens, i.e. of what the spectacles wearer himself is able to see, but not of the appearance of the spectacles wearer, that is, how the spectacles wearer would be perceived by other persons.

However, the quality of a spectacle lens also and not lastly resides in how a spectacles wearer will appear to an opposite person. If spectacles which magnify too strongly because of a too strongly chosen curvature (basis curve) are worn, a so-called "bulging-eyes effect" will appear. A face is changed when spectacles are worn which, because of a too small curvature (mean curvature of the front surface of the spectacle lenses), show large-area reflection-images or small reflection-images. Furthermore, the face is changed when spectacles are worn which, because of unsuitable anti-reflective properties, show ugly residual reflection colors, or which, because of suitable anti-reflective properties, exhibit aesthetic residual reflection colors.

In order that the customer may be able to choose spectacles optimally, consideration must be given to the spectacle frame as well as to the spectacle lens to be fitted in the spectacle frame.

DESCRIPTION OF THE INVENTION

It is the object of the invention to provide a method which will assist the spectacles wearer when purchasing spectacles in making a decision for a certain type of lens and certain anti-reflective properties.

This object is achieved as in patent claim 1 which specifies a method for demonstrating the effect of a particular spectacle frame and of optical lenses fitted into this spectacle frame on the appearance of a spectacles wearer as it would be perceived by another person (virtual observer); the method having the following features:

preparing an image of the face of the spectacles wearer in such manner that the image can be processed in a computer;

determining an arrangement of the respective spectacle frame in front of the eyes, projecting the image of the face onto a plane by means of a computation (ray tracing) of principal rays passing through the center of rotation of an eye of the (virtual) observer, and thus producing a planar image of the face in this plane, taking into account the optical power of a region, through which a principal ray passes, of each spectacle lens (virtually) fitted in the respective lens rim, and its arrangement in front of the eye in computing the paths of principal rays which lie within the lens rims of the spectacle frame or edges of the spectacle lenses, so that an observer of the thus produced planar image of the face with "worn" spectacles can assess a distortion of an eyes portion of the face by the spectacle lenses and thus a quality of the spectacle lenses.

In this, the principal ray computation is made for the so-called "as worn" position of the spectacle lenses, wherein the actual position of the spectacle frame—pantoscopic angle, fitting point height, vertex distance etc.—is determined and further taken into account.

The image of the face may be a given image and, in particular, an image that is selectable from various standard images. Alternatively, the image of the face may be a picture taken of a person with an electronic image recorder. In this case, in particular, a picture of the person wishing to select a spectacle frame and/or spectacle lenses is used as an image, wherein the picture is taken with the person wearing spectacle frames.

The computer produces an image of the spectacle frame on the face of the represented person. In computing the paths of the principal rays which lie within the lens rims of the spectacle frame or the edges of the spectacle lenses, the optical power of a region, through which a principal ray passes, of each spectacle lens (virtually) fitted into the respective lens rim, and its arrangement in front of the eye is taken into account, so that an observer of the thus produced planar image of the face with "worn" spectacles can assess the distortion of the eyes portion of the face by the spectacle lenses and therewith the quality of the spectacle lenses. In particular, it is thus possible to assess whether the so-called bulging-eyes effect occurs or whether the appearance is spoiled by disturbing reflection-images.

The image of the face may be a two-dimensional image, or a three-dimensional image provided with information relating to depth.

When using a three-dimensional image, various images of a face in different head positions are computed. The resulting series of pictures may be shown, in particular as a short film. It is of advantage, when the image or images of the face are pixel images.

Furthermore it is of advantage when only pixel points at selected grid points are computed, and intermediate pixel points are determined by interpolation with a suitable method.

This shortens the time needed for performing the computation, and the customer need not wait too long. The resulting image may be shown to the customer, for example on a PC; and he can observe and compare the effects of various curvatures and/or anti-reflective properties on his face. Thus, by demonstrating to him the impression he will create on another person when wearing particular spectacles, he is visually shown the benefit which previously was explained to him only theoretically.

In addition to a computation according to the ray-tracing method, a computation of the wave-fronts (wave-tracing method) is made, which takes into account the indistinct image-formation by the spectacle lenses.

The reflection of the principal rays of an arbitrarily positioned glaring-light source of arbitrary shape at the front and back faces of the spectacle lenses is computed, and the reflection-images extending as far as the image plane are computed and traced in accordance with the intensity and residual reflection color which depend on the coating and the refractive index and the Abbe number of the spectacle lens material.

The apparatus for performing the above-described method comprises a supporting device for the image, a supporting device for the spectacle lens, a glaring-light source, a supporting device for the face of the virtual observer, and a computer for computing the principal rays.

BRIEF DESCRIPTION OF THE DRAWING

In the following the invention will be described by way of example, without limitation of the general inventive concept, with the aid of embodiments with reference to the drawing to which attention is expressly drawn concerning the disclosure of all details of the invention not described more explicitly in the text.

DESCRIPTION OF AN EXAMPLE OF EMBODIMENT

Figure 1:
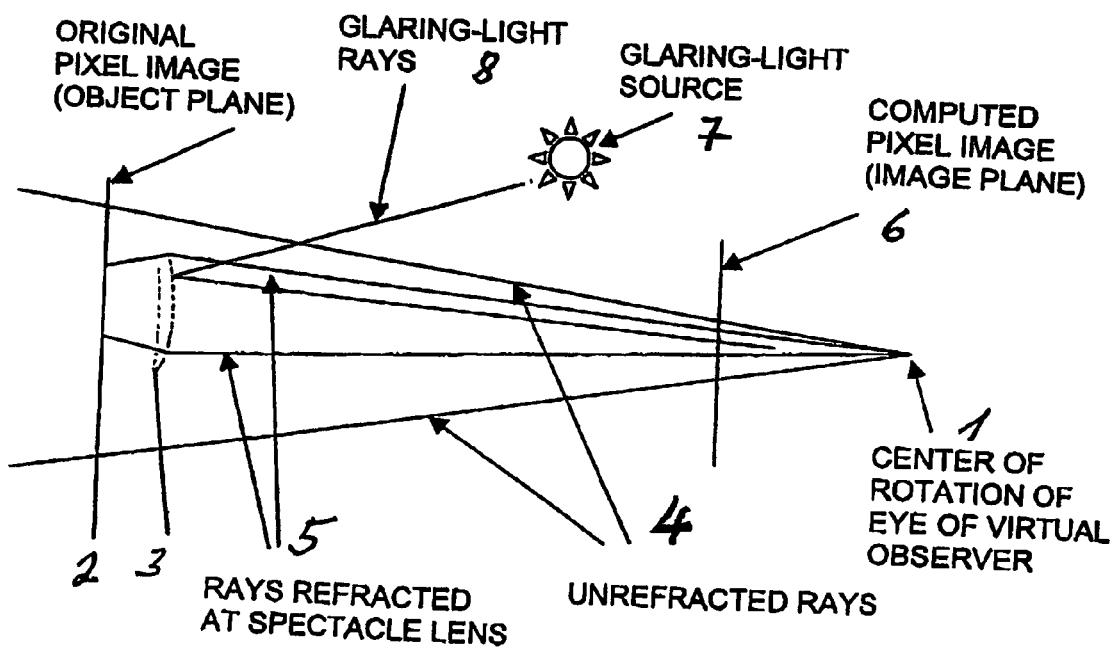
FIG. 1 of the drawing schematically shows the optical components for the calculation of the image.

FIG. 1 illustrates the procedure of the method of the present invention for demonstrating the effect of a particular spectacle frame and the optical lenses fitted into this frame on the appearance of the spectacles wearer as it would be perceived by another person (virtual observer).

Figure 2:
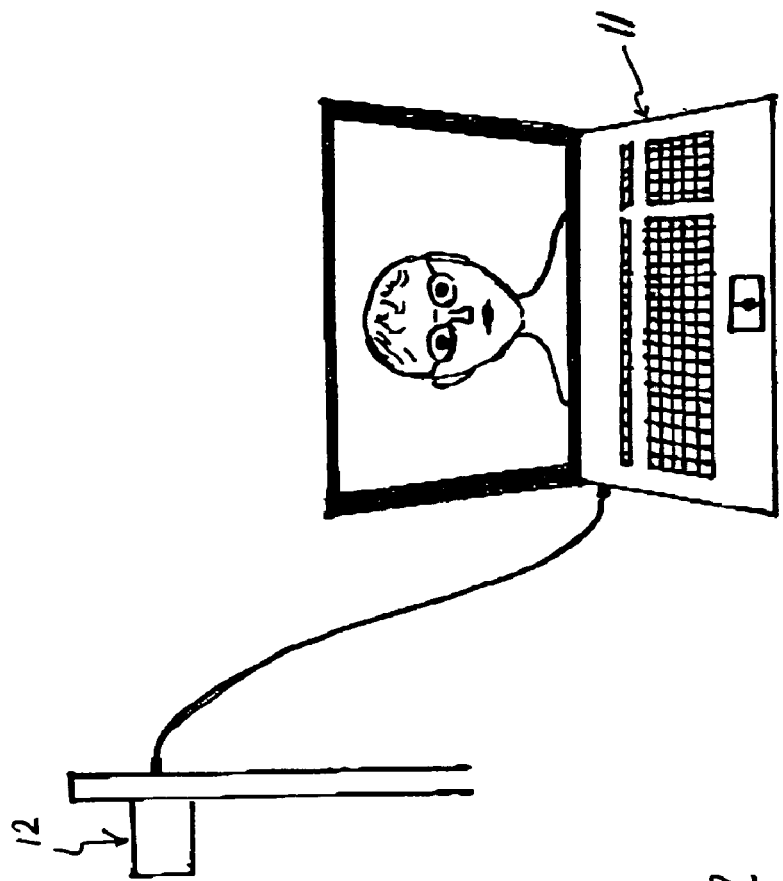
FIG. 2 schematically illustrates a computer and imaging equipment for computing the principal rays and optional glaring-light rays.
Figure 2:
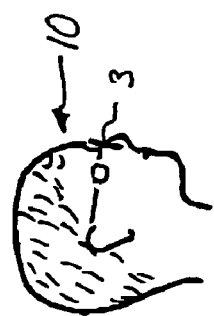

The center of rotation of the eye of the "virtual observer" is designated by the reference numeral 1. Rays proceed from the center of rotation 1 of the eye to an original pixel image 2 of the spectacle wearer's face 10, as shown in FIG. 2, in front of which a particular spectacle lens 3 is disposed in a position as worn, i.e., having a vertex distance, inclination, centration etc. as determined by a particular spectacle frame. The pixel image 2 which represents the face of the spectacles wearer taken by an electronic image recorder 12 is prepared so that the image may be processed in a computer 11.

A portion 4 of the rays proceeding from the center of rotation 1 of the eye of the virtual observer by-passes the spectacle lens 3 without being refracted, whereas the principal rays 5 passing through the spectacle lens 3 are refracted at the front and the back surface, i.e. twice. In computing the path of the principal rays which pass through the spectacle lens 3, the optical power of each spectacle lens (virtually) inserted in the respective spectacle rim and its arrangement in front of the eye is taken into account, so that an observer of the thus produced planar image of the face with spectacles "worn" can assess the distortion of the eye portion of the face by the spectacle lenses and thus the quality of the spectacle lenses.

For this, the principal rays from each pixel of the image 2 passing through the center of rotation 1 of the eye of the virtual observer are computed. The image resulting from this computation is produced in the image plane 6 and is shown to the customer. Furthermore, the effect of a glaring-light source 7 may be demonstrated: The rays 8 originating from the glaring-light source are reflected at the surfaces of the spectacle lens and produce reflection-images in the image plane 6. The positions of all optical components may be chosen freely.

What is claimed is:

1. Method for demonstrating an effect of a particular spectacle frame and of virtual optical lenses fitted into this spectacle frame on an appearance of a spectacles wearer as it would be perceived by a virtual observer, comprising:
    (a) preparing at least one image of a face of the spectacles wearer such that the at least one image can be computer processed;
    (b) determining an arrangement of the particular spectacle frame in front of the eyes of the spectacles wearer,
    (c) projecting the at least one image of the face onto a plane by way of a computation of principal rays passing through a center of rotation of an eye of the virtual observer, thereby producing a planar image of the face in the plane, and
    (d) taking into account an optical power of a region, through which a principal ray passes, of each of the optical lenses virtually fitted in a respective lens rim, and an arrangement of the lenses in front of the eye in computing paths of principal rays which lie within lens rims of the spectacle frame or edges of the spectacle lenses, so that the virtual observer of the thus-produced planar image of the face with "worn" spectacles can assess a distortion of an eyes portion of the face by the spectacle lenses and therewith a quality of the spectacle lenses.

2. Method according to claim 1, wherein the computing of principal rays is performed for an "as worn" position of the spectacle lens.

3. Method according to claim 1, wherein the at least one image of the face is a given image, including an image selectable from various standard images.

4. Method according to claim 3, wherein the computing of principal rays is performed for an "as worn" position of the spectacle lens.

5. A method according to claim 1, wherein the at least one image of the face is a picture of a person recorded with an electronic image recorder.

6. Method according to claim 5, wherein the computing of principal rays is performed for an "as worn" position of the spectacle lens.

7. Method according to claim 5, wherein the picture of the person wishing to select a spectacle frame and/or spectacle lenses is used as an image.

8. Method according to claim 5, wherein the picture is taken of the person wearing a spectacle frame.

9. Method according to claim 8, wherein the picture of the person wishing to select a spectacle frame and/or spectacle lenses is used as an image.

10. Method according to claim 1, wherein the step of preparing an image comprises computer-producing an image of the spectacle frame on the face of the represented person.

11. Method according to claim 1, wherein the at least one image of the face is a two-dimensional image.

12. Method according to claim 1, wherein the at least one image of the face is a three-dimensional image.

13. Method according to claim 12, further comprising computing various images of a face with different head positions, and demonstrating a resulting series of images as a short film.

14. Method according to claim 1, wherein the at least one image of the face is a pixel image.

15. Method according to claim 14, further comprising computing only pixel points at selected grid points, and interpolating intermediate pixel points.

16. Method according to claim 1, further comprising computing wave-fronts (wave-tracing method) to take account of indistinct imaging by the spectacle lenses.

17. Method according to claim 1, further comprising computing a reflection of principal rays of an arbitrarily positioned glaring-light source of arbitrary shape at a front and a back surface of the spectacle lenses, and computing and tracing reflection-images extending as far as the image plane in accordance with an intensity and a residual reflection color which depend on a coating, a refractive index and an Abbe number of a spectacle lens material.

18. Apparatus for demonstrating an effect of a particular spectacle frame and of virtual optical lenses fitted into this spectacle frame on an appearance of a spectacles wearer as it would be perceived by a virtual observer, comprising means for preparing at least one facial image of the spectacles wearer for computer processing;

an optional glaring-light source;

a computer for computing principal rays based upon processing of the at least facial image after determining an arrangement of a spectacle frame in front of the eyes of the spectacles wearer and then projecting the at least one facial image onto a plane via the computed principal rays that pass through a center of rotation of the eye of virtual observer so as to produce a planar image of the spectacles wearer's face, whereby taking into account an optical power of a region, through which a principal ray passes, of each spectacle lens virtually fitted in a respective lens rim, and an arrangement of each spectacle in front of the spectacles wearer's eye in computing oaths of the principal rays which lie within lens rims of the spectacle frame or edges of each spectacle lens and optionally taking into account an effect of the glaring-light source such that the virtual observer of the thus-produced planar image of the face with "worn" spectacles can assess a distortion of an eyes portion of the face by each lens and therewith a quality of each lens.

19. Apparatus according to claim 18, wherein the computing of principal rays is performed for an "as worn" position of the spectacle lens.

20. Apparatus according to claim 19, wherein the at least one image of the face is a given image, including an image selectable from various standard images.

21. Apparatus according to claim 18, wherein the at least one image of the face is a picture of a person recorded with an electronic image recorder.

22. Apparatus according to claim 21, wherein the computing of principal rays is performed for an "as worn" position of the spectacle lens.

23. Apparatus according to claim 21, wherein the picture is taken of the person wearing a spectacle frame.

24. Apparatus according to claim 18, wherein the at least one image of the face is a two-dimensional image.

25. Apparatus according to claim 18, wherein the at least one image of the face is a three-dimensional image.

* * * * *